(12) United States Patent
Ikeda et al.

(10) Patent No.: US 10,290,878 B2
(45) Date of Patent: May 14, 2019

(54) FUEL CELL AND METHOD OF MANUFACTURING FUEL CELL

(71) Applicant: TOYOTA JIDOSHA KABUSHIKI KAISHA, Toyota-shi, Aichi-ken (JP)

(72) Inventors: Kotaro Ikeda, Susono (JP); Hikaru Hasegawa, Sunto-gun (JP); Naohiro Asada, Miyoshi (JP); Makoto Yoshida, Toyota (JP); Tomokazu Hayashi, Seto (JP); Michihisa Mochizuki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 171 days.

(21) Appl. No.: 15/124,852

(22) PCT Filed: Mar. 17, 2015

(86) PCT No.: PCT/JP2015/001470
§ 371 (c)(1),
(2) Date: Sep. 9, 2016

(87) PCT Pub. No.: WO2015/141215
PCT Pub. Date: Sep. 24, 2015

(65) Prior Publication Data
US 2017/0025688 A1    Jan. 26, 2017

(30) Foreign Application Priority Data

Mar. 18, 2014 (JP) .................................. 2014-054314
Mar. 10, 2015 (JP) .................................. 2015-047025

(51) Int. Cl.
*H01M 8/0273* (2016.01)
*H01M 8/0284* (2016.01)
(Continued)

(52) U.S. Cl.
CPC ......... *H01M 8/0273* (2013.01); *H01M 8/028* (2013.01); *H01M 8/0284* (2013.01);
(Continued)

(58) Field of Classification Search
None
See application file for complete search history.

(56) References Cited

U.S. PATENT DOCUMENTS

2004/0157100 A1* 8/2004 Mizuno ............... H01M 8/0254
                                                     429/434
2007/0212589 A1   9/2007 Kobuchi et al.
2007/0231661 A1* 10/2007 Hayashi ............... H01M 8/0247
                                                     429/510

FOREIGN PATENT DOCUMENTS

JP    2005-251676    9/2005
JP    2007-287608    11/2007
(Continued)

OTHER PUBLICATIONS

English translation of JP 2008/041448 (Year: 2008).*

*Primary Examiner* — Yoshitoshi Takeuchi
(74) *Attorney, Agent, or Firm* — Dickinson Wright, PLLC

(57) ABSTRACT

A fuel cell comprises a membrane electrode assembly configured such that electrode catalyst layers are formed on respective surfaces of an electrolyte membrane; gas diffusion layers placed on respective surfaces of the membrane electrode assembly; and a frame placed around periphery of the membrane electrode assembly. The membrane electrode assembly has a protruding portion that is configured by protruding outside of the gas diffusion layer in a state that the membrane electrode assembly is combined with the gas diffusion layers. The frame has an engagement portion that is configured to engage with the protruding portion. An
(Continued)

adhesive layer is formed from an ultraviolet curable adhesive between the protruding portion and the engagement portion.

2 Claims, 12 Drawing Sheets

(51) Int. Cl.
     *H01M 8/028*         (2016.01)
     *H01M 8/1004*      (2016.01)
     *H01M 8/0286*      (2016.01)
(52) U.S. Cl.
     CPC ....... *H01M 8/0286* (2013.01); *H01M 8/1004* (2013.01); *Y02P 70/56* (2015.11)

(56) References Cited

FOREIGN PATENT DOCUMENTS

| JP | 2008/041448 | * | 2/2008 | .............. H01M 8/02 |
|----|-------------|---|--------|------------------------|
| JP | 2008-041448 A | | 2/2008 | |
| JP | 2012-134033 | | 7/2012 | |
| JP | 2013-251253 | | 12/2013 | |

* cited by examiner

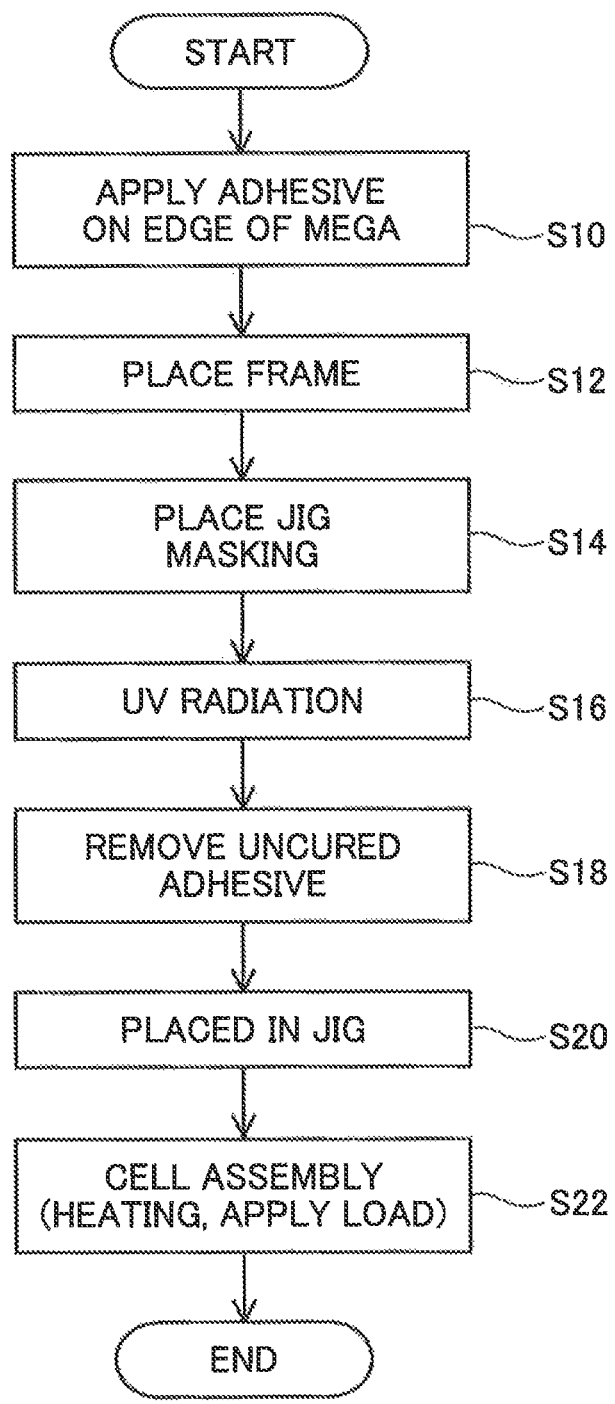

FUEL CELL AND METHOD OF MANUFACTURING FUEL CELL

CROSS-REFERENCE TO RELATED APPLICATIONS

The present application is a national phase application of International Application No. PCT/JP2015/001470, filed Mar. 17, 2015, and claims priority from Japanese patent application P2014-54314 filed on Mar. 18, 2014 and Japanese patent application P2015-47025 filed on Mar. 10, 2015, the contents of which are hereby incorporated by reference into this application.

TECHNICAL FIELD

The present disclosure relates to a fuel cell.

BACKGROUND ART

MEGA (membrane, electrode & gas diffusion layer assembly) may be manufactured by various methods in a fuel cell using a polymer electrolyte membrane (hereinafter may be simply called "electrolyte membrane"). For example, MEGA may be manufactured by stacking gas diffusion layers on respective surfaces of a CCM (catalyst coated membrane) comprised of an electrolyte membrane and electrode catalyst layers. MEGA may also be manufactured by stacking gas diffusion electrodes GDE, each being comprised of an electrode catalyst layer and a gas diffusion layer, on respective surfaces of an electrolyte membrane. MEGAs of these configurations are thin and are likely to be readily bent. JP 2012-134033A describes a fuel cell including a gasket placed around the periphery of the MEGA.

SUMMARY

Technical Problem

The technique described in JP 2012-134033A, however, has high manufacturing cost and is unsuitable for mass production. A MEGA equipped with a frame that is placed around the peripheral of the MEGA (hereinafter also called as "framed MEGA") has accordingly been proposed for the purpose of protection of MEGA and reduction of the manufacturing cost. In the framed MEGA, the MEGA and the frame are bonded to each other using an adhesive. The adhesive used is generally a thermoplastic resin such as PP (polypropylene), in terms of reducing the manufacturing cost. There is, however, a difference in linear expansion coefficient between PP and the gas diffusion layer. Using a thermoplastic resin for the adhesive may thus cause a problem that the entire MEGA including the membrane electrode assembly is likely to have warpage or distortion by heating. The technique described in JP 2012-134033A, JP 2007-287608A and JP 2013-251253A fail to consider suppressing deformation of the membrane electrode assembly of the framed MEGA. This problem is especially remarkable in the case of reducing the thickness of the fuel cell. Other needs over the prior art fuel cell include, for example, easy manufacture, cost reduction, resource saving and improvement of performance.

Solution to Problem

In order to solve at least part the problems described above, the disclosure may be implemented by aspects described below.

(1) According to one aspect of the disclosure, a fuel cell is provided. This fuel cell comprises a membrane electrode assembly configured such that electrode catalyst layers are formed on respective surfaces of an electrolyte membrane; gas diffusion layers placed on respective surfaces of the membrane electrode assembly; and a frame placed around periphery of the membrane electrode assembly. The membrane electrode assembly has a protruding portion that is configured by protruding outside of the gas diffusion layer in a state that the membrane electrode assembly is combined with the gas diffusion layers. The frame has an engagement portion that is configured to engage with the protruding portion. The fuel cell further comprises an adhesive layer formed from an ultraviolet curable adhesive between the protruding portion and the engagement portion. In the fuel cell of this aspect, the adhesive layer between the protruding portion of the membrane electrode assembly provided by protruding outside in the state that the membrane electrode assembly is combined with the gas diffusion layers and the engagement portion of the frame provided to engage with the protruding portion is formed from the ultraviolet curable adhesive. This does not require any heating process to bond the membrane electrode assembly with the gas diffusion layers placed thereon to the frame. This configuration accordingly suppresses the problem conventionally arising when a thermoplastic resin such as PP is used for the frame, i.e., deformation (warpage or the like) of the membrane electrode assembly due to the difference in linear expansion coefficient between the frame and the gas diffusion layer.

(2) In the fuel cell of the above aspect, the adhesive layer may further contain a heat hardener. Since the heat hardener is included in the adhesive layer, the uncured adhesive may be cured by heating the frame and the membrane electrode assembly in the process of manufacturing each cell of the fuel cell in a method of manufacturing the fuel cell of this aspect.

(3) In the fuel cell of the above aspect, the frame may be formed from a thermoplastic resin. In the fuel cell of this aspect, the frame is formed from the thermoplastic resin. For example, inexpensive polypropylene may thus be used as the material of the frame.

(4) In the fuel cell of the above aspect, the engagement portion of the frame may include a through hole that is formed to pass through the frame in a thickness direction of the frame. In the fuel cell of this aspect, the through hole is formed in the engagement portion of the frame to pass through the frame in the thickness direction of the frame. When the protruding portion of the membrane electrode assembly and the engagement portion of the frame are combined with each other via the adhesive provided therebetween, this configuration enables the adhesive to be exposed in a region of the engagement portion where the through hole is provided. As a result, ultraviolet radiation through the through hole (in other words, ultraviolet radiation to the exposed portion of the adhesive) enables the adhesive to be surely cured and form the adhesive layer. Additionally, in the fuel cell of this aspect, even when the condition of ultraviolet radiation for curing the adhesive overlaps with the ultraviolet blocking characteristic of the frame, ultraviolet radiation through the through hole cures the adhesive to form an adhesive layer.

(5) In the fuel cell of the above aspect, the frame may further include a protective layer that transmits ultraviolet light and that is formed to cover at least an opening of the through hole. In the fuel cell of this aspect, at least the opening of the through hole is covered by the protective layer. Even when a readily deformable adhesive, for example, in the liquid form, jelly form, gel-like form or cream form, is used to form the adhesive layer, this configuration suppresses the adhesive from entering the through hole of the frame. The protective layer allows for transmission of ultraviolet radiation. Ultraviolet radiation emitted through the through hole across the protective layer enables the adhesive to be surely cured and form the adhesive layer.

(6) In the fuel cell of the above aspect, the protective layer of the frame may be formed from a thermoplastic resin. In the fuel cell of this aspect, the protective layer of the frame is formed from the thermoplastic resin. In the process of manufacturing each cell of the fuel cell, the protective layer may thus be bonded to a member placed in the periphery of the protective layer and cured by heating the frame and the membrane electrode assembly.

(7) According to one aspect of the disclosure, there is provided a method of manufacturing a fuel cell, the fuel cell comprising a membrane electrode assembly configured such that electrode catalyst layers are formed on respective surfaces of an electrolyte membrane; gas diffusion layers placed on respective surfaces of the membrane electrode assembly; and a frame placed around periphery of the membrane electrode assembly. The method of manufacturing the fuel cell comprises: placing an ultraviolet curable adhesive on at least one of (a) a protruding portion of the membrane electrode assembly that is provided by protruding outside of the gas diffusion layer in a state that the membrane electrode assembly is combined with the gas diffusion layers, and (b) an engagement portion of the frame provided to engage with the protruding portion; engaging the protruding portion with the engagement portion; and curing the adhesive by ultraviolet radiation. The method of manufacturing the fuel cell of this aspect places the ultraviolet curable adhesive on at least one of the protruding portion of the membrane electrode assembly that is provided by protruding outside in the state that the membrane electrode assembly and the gas diffusion layer are combined with each other, and the engagement portion of the frame provided to engage with the protruding portion, and subsequently cures the adhesive by ultraviolet radiation. This does not require any heating process to bond the membrane electrode assembly with the gas diffusion layers placed thereon to the frame. This configuration accordingly suppresses the problem conventionally arising when a thermoplastic resin such as PP is used for the frame, i.e., deformation (warpage or the like) of the membrane electrode assembly due to the difference in linear expansion coefficient between the frame and the gas diffusion layer.

(8) The method of manufacturing the fuel cell of the above aspect may further comprise placing a member that blocks ultraviolet light while avoiding the protruding portion and the engagement portion, after the engaging. The method of manufacturing the fuel cell of this aspect places the member that blocks ultraviolet light to avoid the protruding portion and the engagement portion and subsequently cures the adhesive by ultraviolet radiation. This configuration causes only the protruding portion, i.e., the thinned portion of the membrane electrode assembly provided by protruding outside, and the engagement portion, i.e., the thinned portion of the frame, to be irradiated with ultraviolet radiation and thereby efficiently cures the adhesive. This results in shortening the ultraviolet radiation time and suppressing a temperature rise of the gas diffusion layer and the frame and the occurrence of a difference in linear expansion coefficient accompanied by absorption of ultraviolet radiation.

(9) The method of manufacturing the fuel cell of the above aspect may further comprise removing an uncured portion of the adhesive on a surface of the gas diffusion layer, after the curing. In the method of manufacturing the fuel ell of this aspect, the adhesive on the surface of the gas diffusion layer is uncured and is thus readily removable.

(10) In the method of manufacturing the fuel cell of the above aspect, the adhesive may contain a heat hardener. The method of manufacturing the fuel cell may further comprise heating the membrane electrode assembly bonded to the frame, so as to manufacture each cell of the fuel cell. In the method of manufacturing the fuel cell of this aspect, the heat hardener is included in the adhesive. In the process of manufacturing each cell of the fuel cell, the remaining uncured adhesive may thus be cured by heating the frame and the membrane electrode assembly. As a result, this suppresses the uncured adhesive from remaining in each cell of a completed product.

(11) In the method of manufacturing the fuel cell of the above aspect, the engagement portion of the frame may include a through hole that is formed to pass through the frame in a thickness direction of the frame. The method of manufacturing the fuel cell may further comprise irradiating the through hole with light and detecting luminescence of the adhesive, so as to detect a curing state of the adhesive, after the curing. In the method of manufacturing the fuel cell of this aspect, the through hole is formed in the engagement portion of the frame to pass through the frame in the thickness direction of the frame. Even when the frame has the ultraviolet blocking characteristic, radiation of light (for example, ultraviolet radiation) through the through hole enables the curing state of the adhesive to be securely detected. As a result, this configuration enables a non-contact, non-destructive curing test to be performed using a device such as an ultraviolet curing sensor.

The disclosure may be implemented by any of various aspects, for example, a framed MEGA, a fuel cell, a manufacturing method, a manufacturing apparatus and a manufacturing system of the framed MEGA or the fuel cell, a computer program configured to control any of these methods and apparatuses, and a non-transitory recording medium in which the computer program is recorded.

BRIEF DESCRIPTION OF DRAWINGS

FIG. 3 is a flowchart showing a procedure of manufacturing the fuel cell using the framed MEGA;

DESCRIPTION OF EMBODIMENTS

A. First Embodiment

A-1. Structure of Fuel Cell

Figure 1:
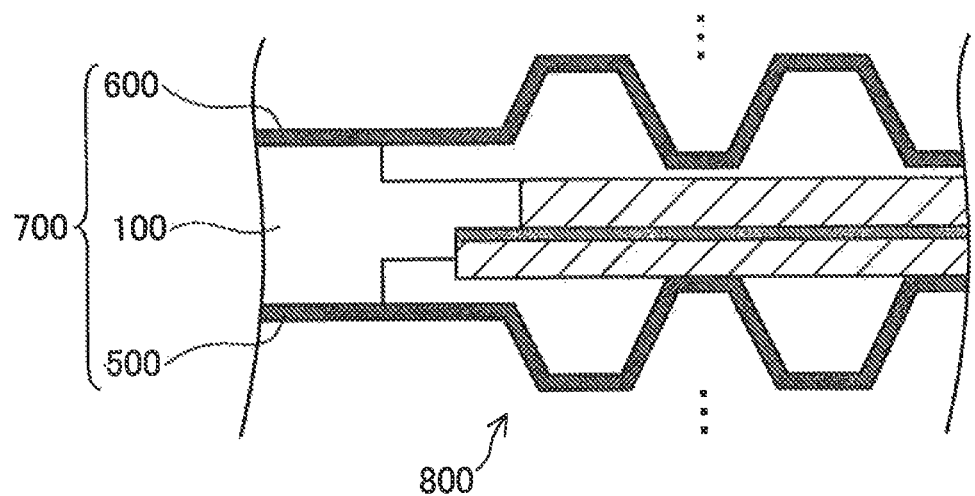
FIG. 1 is a diagram illustrating the structure of a fuel cell using a framed MEGA according to one embodiment of the disclosure.

FIG. 1 is a diagram illustrating the structure of a fuel cell using a framed MEGA according to one embodiment of the disclosure. FIG. 1 illustrates part of the sectional structure of a fuel cell 800. The fuel cell 800 is a polymer electrolyte fuel cell configured by stacking a plurality of stacked bodies 700. The fuel cell 800 generates electric power using hydrogen gas supplied as a fuel gas and the air supplied as an oxidizing gas. Water serving as a cooling medium is circulated in the fuel cell 800, so as to regulate the internal temperature of the fuel cell 800 to temperature adequate for power generation.

The stacked body 700 includes an MEGA equipped with a frame (hereinafter also called "framed MEGA") 100, an anode-side separator 500 and a cathode-side separator 600. The anode-side separator 500 forms a flow path configured to supply the hydrogen gas to the fuel cell 800. The cathode-side separator 600 forms a flow path configured to supply the air to the fuel cell 800.

A-2. Structure of Framed MEGA

Figure 2:
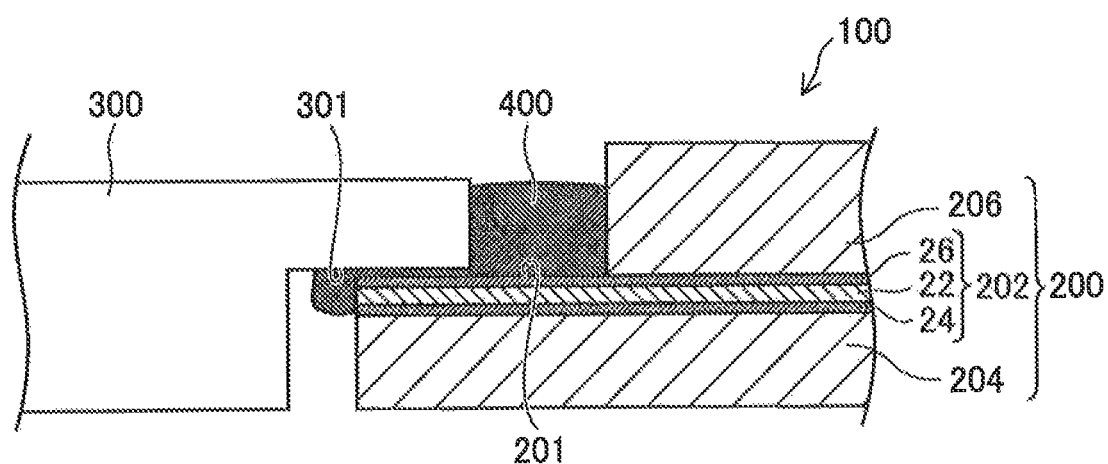
FIG. 2 is a diagram illustrating the structure of the framed MEGA.

FIG. 2 is a diagram illustrating the structure of the framed MEGA. FIG. 2 illustrates part of the section of the framed MEGA 100. The framed MEGA 100 is in a plate-like shape and includes an MEGA 200 and a frame 300 that are bonded to each other via an adhesive layer of an adhesive 400.

The MEGA 200 includes an anode-side gas diffusion layer 204 and a cathode-side gas diffusion layer 206 that are placed on respective surfaces of a CCM 202. The CCM 202 includes an anode-side electrode catalyst layer 24 and a cathode-side electrode catalyst layer 26 that are placed on respective surfaces of an electrolyte membrane 22. The CCM 202 is also called "membrane electrode assembly 202". The electrolyte membrane 22 is a proton-conductive ion exchange membrane made of a solid polymer material, for example, a fluororesin having perfluorocarbon sulfonic acid, and shows good electrical conductivity in the wet state. Both the anode-side electrode catalyst layer 24 and the cathode-side electrode catalyst layer 26 include catalyst-supported carbon that has a catalyst such as platinum or a platinum alloy supported thereon.

Each of the anode-side gas diffusion layer 204 and the cathode-side gas diffusion layer 206 is comprised of a porous base material for diffusion layer. The base material for diffusion layer used may be, for example, a carbon porous body (for example, carbon paper, carbon cloth or glass carbon) or a metal porous body (for example, metal mesh or metal foam). The anode-side gas diffusion layer 204 is formed in a rectangular shape having the similar size to that of the CCM 202 in the plan view. The cathode-side gas diffusion layer 206 is, on the other hand, formed in a rectangular shape having the slightly smaller size than that of the CCM 202. Accordingly, in the state that the CCM 202 is assembled with the gas diffusion layers (i.e., the anode-side gas diffusion layer 204 and the cathode-side gas diffusion layer 206), the CCM 202 has a protruding portion 201 that protrudes outside of the cathode-side gas diffusion layer 206. In other words, in the section of the framed MEGA 100 shown in FIG. 2, the shape of the edge around the periphery of the MEGA 200 is a step-like shape formed by protruding the CCM 202 outside of the cathode-side gas diffusion layer 206.

The frame 300 is made of thermoplastic PP (polypropylene). The frame 300 is formed in a frame shape to be engaged with the periphery of the MEGA 200. More specifically, the frame 300 is formed in a frame shape including a larger space corresponding to the CCM 202 and the anode-side gas diffusion layer 204 and a smaller space corresponding to the cathode-side gas diffusion layer 206, so as to be engaged with the protruding portion 201 of the MEGA 200. The stepped portion of this frame shape is also called "engagement portion 301". In other words, in the section of the framed MEGA 100 shown in FIG. 2, the shape of the edge of the frame 300 is a step-like shape to be engaged with the MEGA 200. The frame 300 may be manufactured by, for example, injection molding.

Instead of PP, for example, a phenolic resin, an epoxy resin, PE (polyethylene) or PET (polyethylene terephthalate) may be used for the frame 300. A thermosetting resin may also be used for the frame 300. The frame 300 may be manufactured, for example, by melt extrusion molding, instead of injection molding.

The adhesive 400 is an ultraviolet curable liquid adhesive that has a characteristic of being cured when an adhesive-applied area is irradiated with ultraviolet radiation of a predetermined wavelength. The adhesive 400 used may be, for example, a radical polymerizable resin-based ultraviolet curable adhesive or a cationic polymerizable resin-based ultraviolet curable adhesive. When the radical polymerizable resin-based ultraviolet curable adhesive is used for the adhesive 400, it is desirable to add a predetermined amount of a heat hardener. This reason will be described later. The amount of the heat hardener added may be determined appropriately. The adhesive 400 may be in any form, for example, jelly form, gel-like form or cream form.

In the fuel cell having the structure described above, the adhesive 400 (adhesive layer) between (a) the protruding portion 201, which is provided by protruding the CCM 202 outside in the state that the CCM 202 (membrane electrode assembly) is assembled with the cathode-side gas diffusion layer 206 and the anode-side gas diffusion layer 204 (gas diffusion layers), and (b) the engagement portion 301 of the frame 300, which is provided to engage with the protruding portion 201, is comprised of the ultraviolet curable adhesive. This does not require any heating process to bond the MEGA 200 (membrane electrode assembly with gas diffusion layers placed thereon) to the frame 300. This configuration accordingly suppresses the problem conventionally arising when the thermoplastic resin such as PP is used for the frame 300, i.e., deformation (warpage or the like) of the CCM 202 due to the difference in linear expansion coefficient between the frame 300 and the cathode-side gas diffusion layer 206 (gas diffusion layer).

A-3. Method of Manufacturing Fuel Cell

Figure 4A:
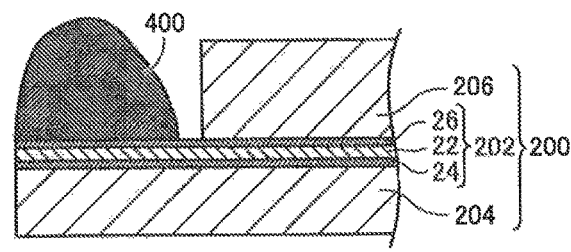
FIGS. 4A to 4D are diagrams illustrating the process of manufacture when an adhesive is applied using a dispenser.
Figure 4B:
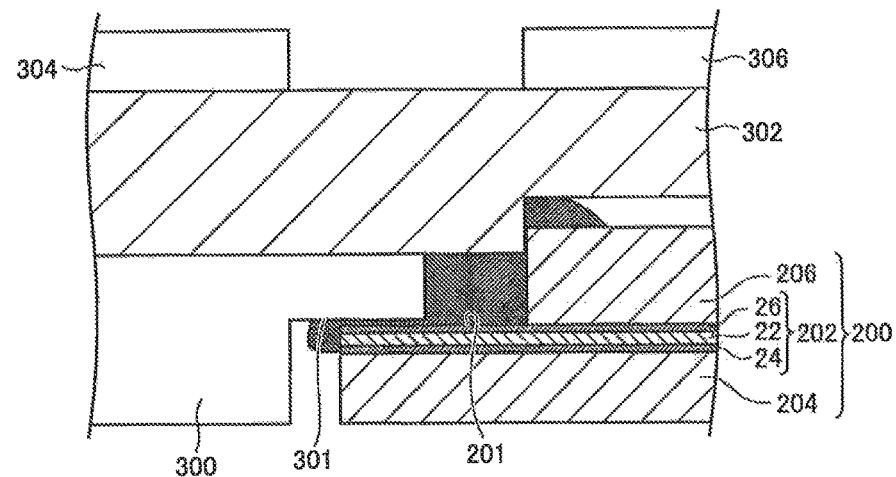
Figure 4C:
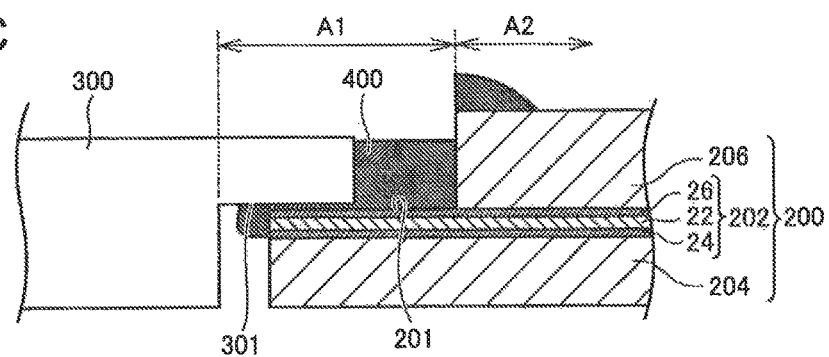
Figure 4D:
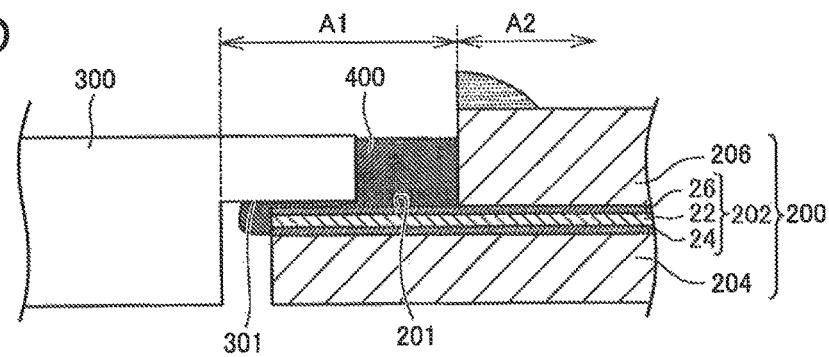
Figure 5A:
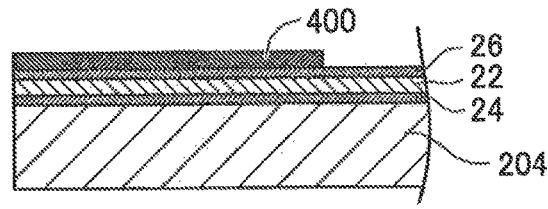
FIGS. 5A to 5C are diagrams illustrating the process of manufacture when an adhesive is applied by screen printing.
Figure 5B:
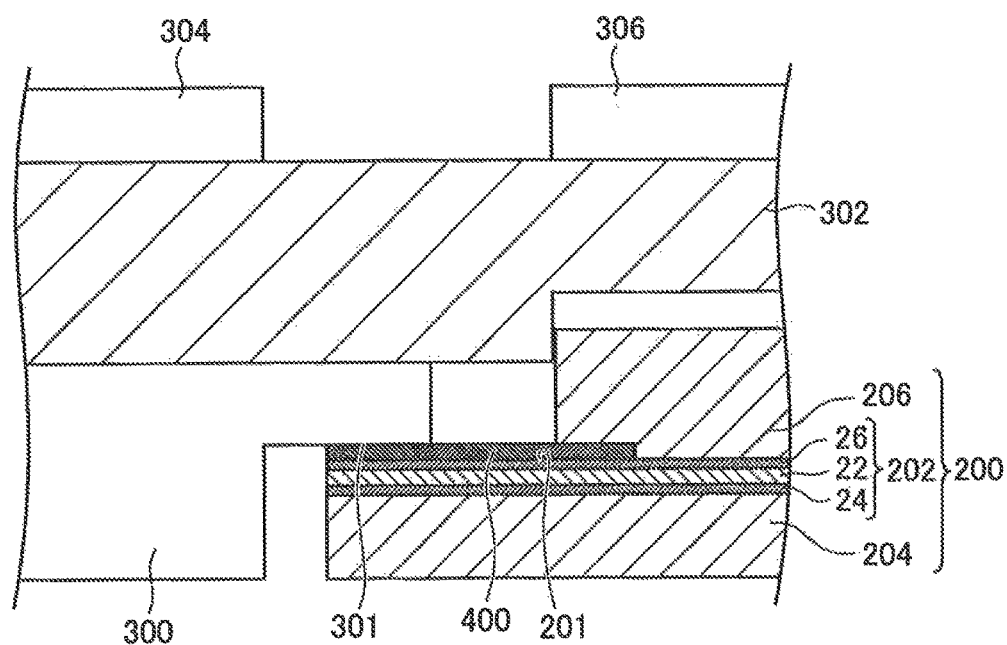
Figure 5C:
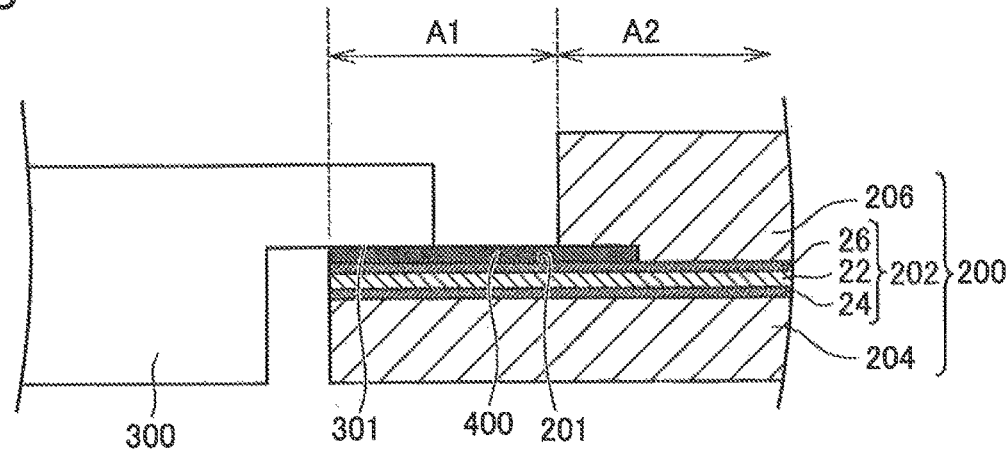

FIG. 3 is a flowchart showing a procedure of manufacturing the fuel cell using the framed MEGA. FIGS. 4A to 4D are diagrams illustrating the process of manufacture when the adhesive is applied using a dispenser. FIGS. 5A to 5C are diagrams illustrating the process of manufacture when the adhesive is applied by screen printing. FIGS. 4A to 4D and 5A to 5C illustrate the section of the CCM 202 and the gas diffusion layers in the stacking direction. In the description below with reference to FIGS. 3, 4A to 4D and 5A to 5C, the side where the cathode-side gas diffusion layer 206 is placed is described as the upper side, and the side where the anode-side gas diffusion layer 204 is placed is described as the lower side.

At step S10 in FIG. 3, the adhesive 400 is applied on the edge of the MEGA 200. More specifically, in the case of using a dispenser, as shown in FIG. 4A, the adhesive 400 is applied on the protruding portion 201 of the MEGA 200, i.e., a portion outside of the cathode-side gas diffusion layer 206 and on the periphery of the CCM 202. In the case of using screen printing, on the other hand, as shown in FIG. 5A, the adhesive 400 is applied on the periphery of the other surface of the CCM 202 in the state that the anode-side gas diffusion layer 204 is formed on one surface of the CCM 202.

At step S12 in FIG. 3, the frame 300 is placed relative to the MEGA 200. More specifically, as shown in FIG. 4B and FIG. 5B, the frame 300 is placed relative to the MEGA 200, such that at least part of the protruding portion 201 of the MEGA 200 and at least part of the engagement portion 301 of the frame 300 are engaged with each other. In the case of using screen printing, before the frame 300 is placed, the cathode-side gas diffusion layer 206 is formed over the adhesive 400 (shown in FIG. 5B). As a result, in the case of using screen printing, the adhesive 400 is also applied on the protruding portion 201 of the MEGA 200.

At step S14 in FIG. 3, a jig is placed and masking is performed. More specifically, a jig 302 is placed on the surface with the adhesive 400 applied thereon (upper side in the illustration) of the MEGA 200 to which the frame 300 is placed. The jig 302 is an instrument used to indicate and guide the working position during assembly of the framed MEGA 100 and is made of an ultraviolet transmitting material (for example, quartz). After the jig 302 is placed, a first masking member 304 and a second masking member 306 are placed on the upper surface of the jig 302. The first and the second masking members 304 and 306 are placed to cover a part other than the protruding portion 201 of the MEGA 200 and the engagement portion 301 of the frame 300. In other words, the first and the second masking members 304 and 306 are placed to avoid the protruding portion 201 of the MEGA 200 and the engagement portion 301 of the frame 300. The first and the second masking members 304 and 306 are made of a material that blocks ultraviolet light (for example, aluminum foil that reflects ultraviolet light). The term "block" herein means reflection, absorption and combination thereof.

At step S16 in FIG. 3, ultraviolet radiation is emitted from the space above the upper side of the jig 302. Ultraviolet radiation cures the adhesive 400 in an area A1 where neither of the first and the second masking members 304 and 306 is placed, as shown in FIG. 4C and FIG. 5C. The adhesive 400 is kept uncured in an area A2 where the first or the second masking member 304 or 306 is placed.

At step S18 in FIG. 3, after removal of the first and the second masking members 304 and 306 and the jig 302, the uncured adhesive 400 remaining on the surface of the cathode-side gas diffusion layer 206 is removed. Step S18 may be performed only when the adhesive is applied using a dispenser and may be omitted when the adhesive is applied by screen printing. This results in removing the uncured adhesive 400 applied on the upper side of the cathode-side gas diffusion layer 206 as shown in FIG. 4D.

At step S20 in FIG. 3, the framed MEGA 100 is placed in a jig for cell assembly. In this stage, separators and seal members are placed relative to the framed MEGA 100. The separators are placed on the respective surfaces of the framed MEGA 100 to serve as power collectors (the anode-side separator 500 and the cathode-side separator 600 shown in FIG. 1). The seal members serve to provide insulation between the separators and seal inside of the cell (not shown). Each cell of the fuel cell using the framed MEGA 100 is completed by heating the cell and applying a load at subsequent step S22. As a result of heating at step S22, in the case of using screen printing, the adhesive 400 is cured in the area A2 where the first or the second masking members 304 or 306 is placed.

The first embodiment described above applies the adhesive 400 on the protruding portion 201 of the MEGA 200 and subsequently places the frame 300. A modification may apply the adhesive 400 on the engagement portion 301 of the frame 300 and subsequently place the frame 300 to be engaged with the protruding portion 201 of the MEGA 200. The adhesive 400 may thus be placed on at least one of the protruding portion 201 of the MEGA 200 and the engagement portion 301 of the frame 300. The adhesive 400 may be applied on both the protruding portion 201 of the MEGA 200 and the engagement portion 301 of the fame 300.

The method of manufacturing the fuel cell including the above series of processes places the ultraviolet curable adhesive 400 on at least one of the protruding portion 201 provided by protruding the CCM 202 outside and the engagement portion 301 provided to engage with the protruding portion 201 of the MEGA 200 in the state that the CCM 202 (membrane electrode assembly) is assembled with the cathode-side gas diffusion layer 206 and the anode-side gas diffusion layer 204 (gas diffusion layers), and subsequently cures the adhesive 400 by ultraviolet radiation. This does not require any heating process to bond the MEGA 200 (membrane electrode assembly with gas diffusion layers placed thereon) to the frame 300. This configuration accordingly suppresses the problem conventionally arising when the thermoplastic resin such as PP is used for the-frame 300, i.e., deformation (warpage or the like) of the CCM 202 due to the difference in linear expansion coefficient between the-frame 300 and the cathode-side gas diffusion layer 206 (gas diffusion layer). This method of manufacturing the fuel cell places the members that block ultraviolet light, i.e., the masking member 304 and the masking member 306, to avoid the protruding portion 201 of the MEGA 200 and the engagement portion 301 of the-frame 300 and subsequently cures the adhesive 400 by ultraviolet radiation. This configuration causes only the protruding portion 201 of the MEGA 200, i.e., the thinned portion provided by protruding the CCM 202 outside, and the engagement portion 301, i.e., the thinned portion of the-frame 300, to be irradiated with ultraviolet radiation and thereby efficiently cures the adhesive 400. This results in shortening the ultraviolet radiation time and suppressing a temperature rise of the cathode-side gas diffusion layer 206, the anode-side gas diffusion layer 204 and the frame 300 and the occurrence of a difference in linear expansion coefficient accompanied by absorption of ultraviolet radiation.

Additionally, the method of manufacturing the fuel cell described above cures the adhesive 400 prior to the cell assembly at steps S20 and S22. This configuration suppresses uneven gas distribution and deterioration of the performance of the fuel cell caused by invasion of the liquid adhesive 400 into the flow path of the separator.

Furthermore, in the above method of manufacturing the fuel cell with applying the adhesive using a dispenser (shown in FIGS. 4A to 4D), the adhesive 400 remaining on the surface of the cathode-side gas diffusion layer 206 (gas diffusion layer) is uncured and is thus readily removable. Removing the adhesive 400 remaining on the surface of the gas diffusion θlayer suppresses the load concentration.

Moreover, in the above method of manufacturing the fuel cell, the heat hardener is added to the adhesive 400, so that the remaining uncured adhesive 400 may be cured when the framed MEGA 100 (membrane electrode assembly with frame and gas diffusion layers placed thereon) is heated in the process of cell assembly of the fuel cell. This results in suppressing the uncured adhesive 400 from remaining in a completed cell.

B. Second Embodiment

A second embodiment of the present disclosure describes a structure including an engagement portion of a frame formed in a different shape. The like components and the like processes to those of the first embodiment are expressed by the like signs to those of the first embodiment described above, and their detailed descriptions are omitted. In other words, the components and the processes that are not specifically described below are equivalent to those of the first embodiment described above.

B-1. Structure of Fuel Cell

The structure of a fuel cell according to the second embodiment is similar to that of the first embodiment shown in FIG. 1, except a framed MEGA 100a is provided in place of the framed MEGA 100.

B-2. Structure of Framed MEGA

Figure 6:
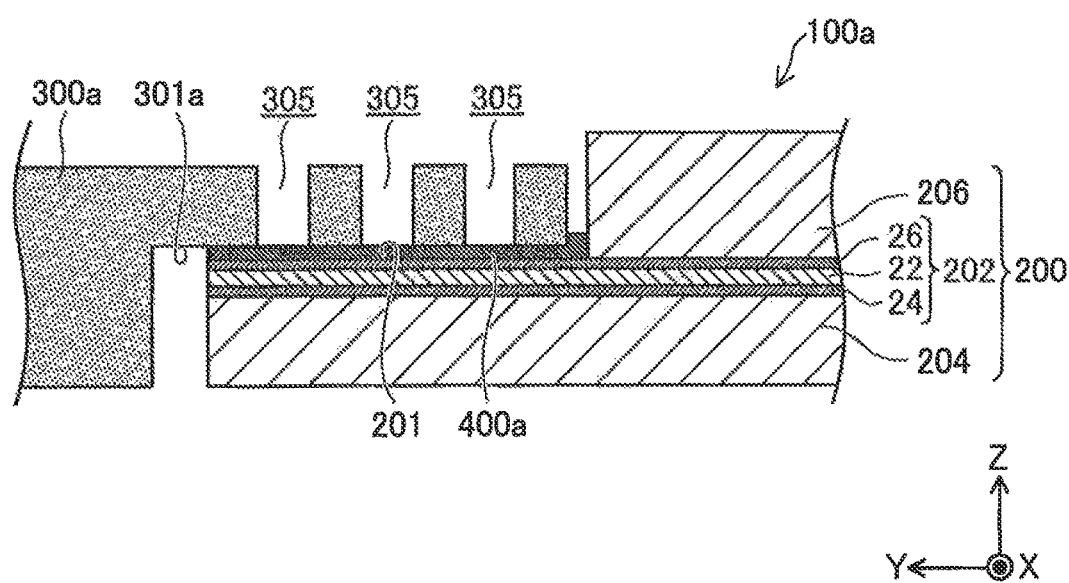
FIG. 6 is a diagram illustrating the structure of a framed MEGA according to a second embodiment.
Figure 7:
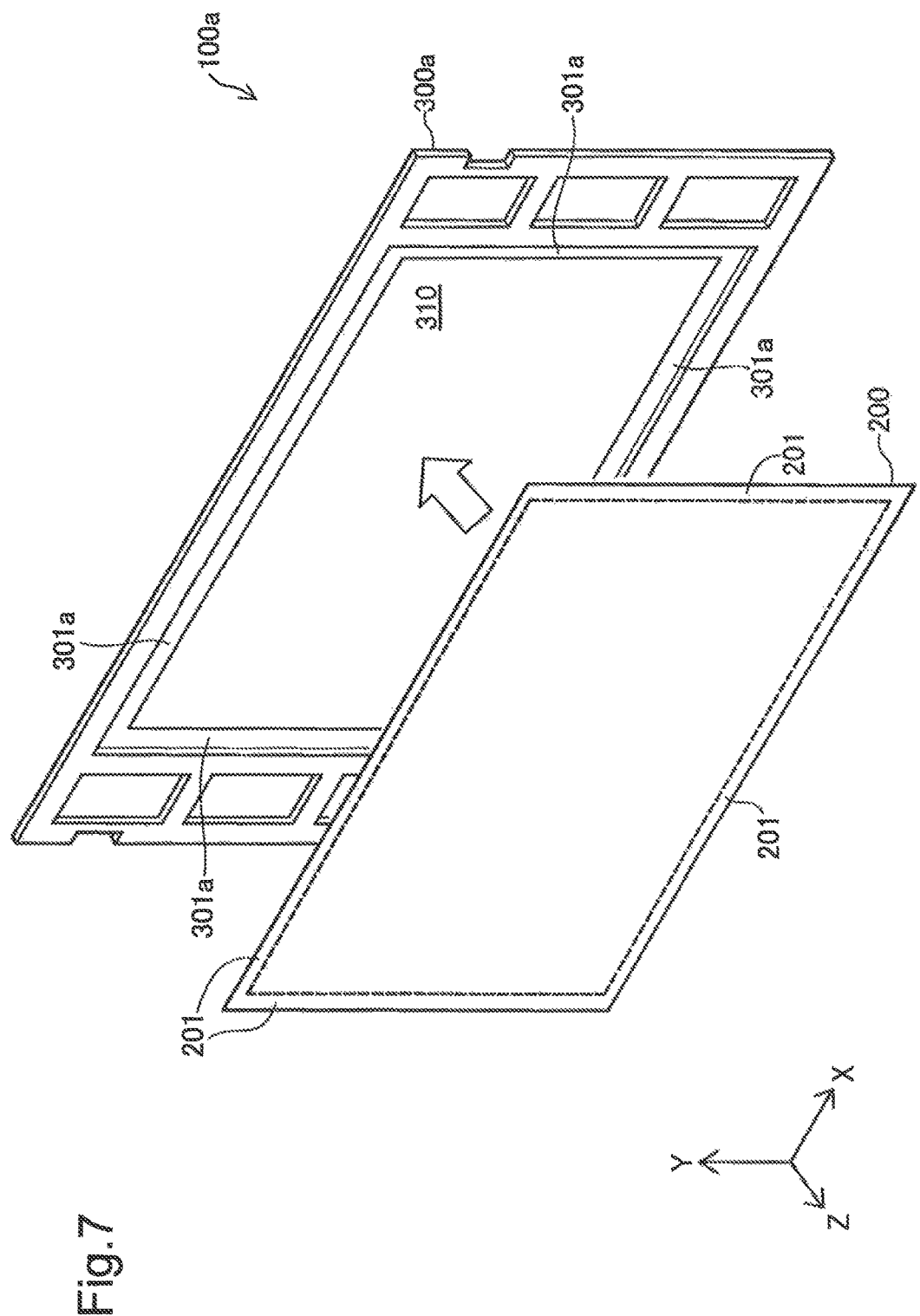
FIG. 7 is a diagram illustrating the general structure of the framed MEGA according to the second embodiment.

FIG. 6 is a diagram illustrating the structure of the framed MEGA according to the second embodiment. FIG. 6 illustrates part of the section of the framed MEGA 100a. FIG. 7 is a diagram illustrating the general structure of the framed MEGA according to the second embodiment. In the following description with reference to FIGS. 6 and 7, the longitudinal direction of the framed MEGA 100a is defined as X-axis direction, the short axis direction of the framed MEGA 100a as Y-axis direction, and the thickness direction of the framed MEGA 100a as Z-axis direction. In other words, the Z-axis direction denotes a direction in which a frame 300a and an MEGA 200 are stacked (direction shown by an arrow in FIG. 7).

The framed MEGA 100a of this embodiment includes the frame 300a in place of the frame 300 (shown in FIG. 2) and an adhesive 400a in place of the adhesive 400.

The frame 300a has four engagement portions 301a that are provided to respectively engage with protruding portions 201 formed on four sides of the MEGA 200 (shown in FIG. 7). This structure is similar to the structure of the frame 300 of the first embodiment. The frame 300a is, however, made of thermosetting PEN (polyethylene terephthalate). PEN has the higher rigidity, the better mechanical properties and the higher heat resistance than PET and the like, while having a characteristic of blocking ultraviolet light. PEN used for the frame 300a of this embodiment blocks, for example, ultraviolet rays having the wavelength equal to or lower than 380 nm.

As shown in FIG. 6, through holes 305 are formed in the engagement portion 301a of the frame 300a to pass through the frame 300a in the thickness direction of the framed MEGA 100a. The thickness direction of the framed MEGA 100a is, in other words, the thickness direction of the frame 300a and is the Z-axis direction shown in FIG. 6. The number of the through holes 305 may be set to any number that provides the adhesion endurable in inter-process conveyance in a method of manufacturing a fuel cell described below with reference to FIG. 8. For example, any of aspects a1 to a3 described below may be employed:

(a1) aspect of providing the four engagement portions 301a with only one through hole 305;

(a2) aspect of providing each of the four engagement portions 301a with one through hole 305; and (a3) aspect of providing each of the four engagement portions 301a with one or multiple through holes 305. In the aspect a3, the number of the through holes 305 in one engagement portion 301a may be equal to or different from the number of the through holes 305 in another engagement portion 301a.

The shape of the through hole 305 may be set appropriately. For example, in the plan view of the frame 300a in the Z-axis direction of FIG. 6, the through hole 305 may be formed in a circular shape, in a polygonal shape or in a slit-like shape. The size of the through hole 305 may also be set appropriately.

The adhesive 400a is an ultraviolet curable adhesive. The wavelength for curing the adhesive 400a is equal to or lower than 380 nm (for example, 365 nm). As described above, according to the second embodiment, the condition of ultraviolet radiation for curing the adhesive 400a (equal to or lower than 380 nm) overlaps with the ultraviolet blocking characteristic of the frame 300a (equal to or lower than 380 nm). The adhesive 400a used may be, for example, a radical polymerizable resin-based ultraviolet curable adhesive or a cationic polymerizable resin-based ultraviolet curable adhesive. A predetermined amount of a heat hardener may be added to the adhesive 400a. The amount of the heat hardener added may be determined appropriately.

In the fuel cell having the configuration described above, the through holes 305 are formed in the engagement portion 301a of the frame 300a to pass through the frame 300a in the thickness direction of the frame 300a (Z-axis direction). This configuration causes the adhesive 400a to be exposed in the area of the engagement portion 301 where the through holes 305 are provided when the protruding portion 201 of the CCM 202 (membrane electrode assembly) and the engagement portion 301 of the frame 300a are assembled with each other via the adhesive 400a placed therebetween. As a result, ultraviolet radiation through the through holes 305 (in other words, ultraviolet radiation to the exposed portions of the adhesive 400a) enables the adhesive 400a to be surely cured and form an adhesive layer. Additionally, in the fuel cell of this embodiment, even when the condition of ultraviolet radiation for curing the adhesive 400a overlaps with the ultraviolet blocking characteristic of the frame 300a, ultraviolet radiation through the through holes 305 cures the adhesive 400a to form an adhesive layer.

B-3. Method of Manufacturing Fuel Cell

Figure 8:
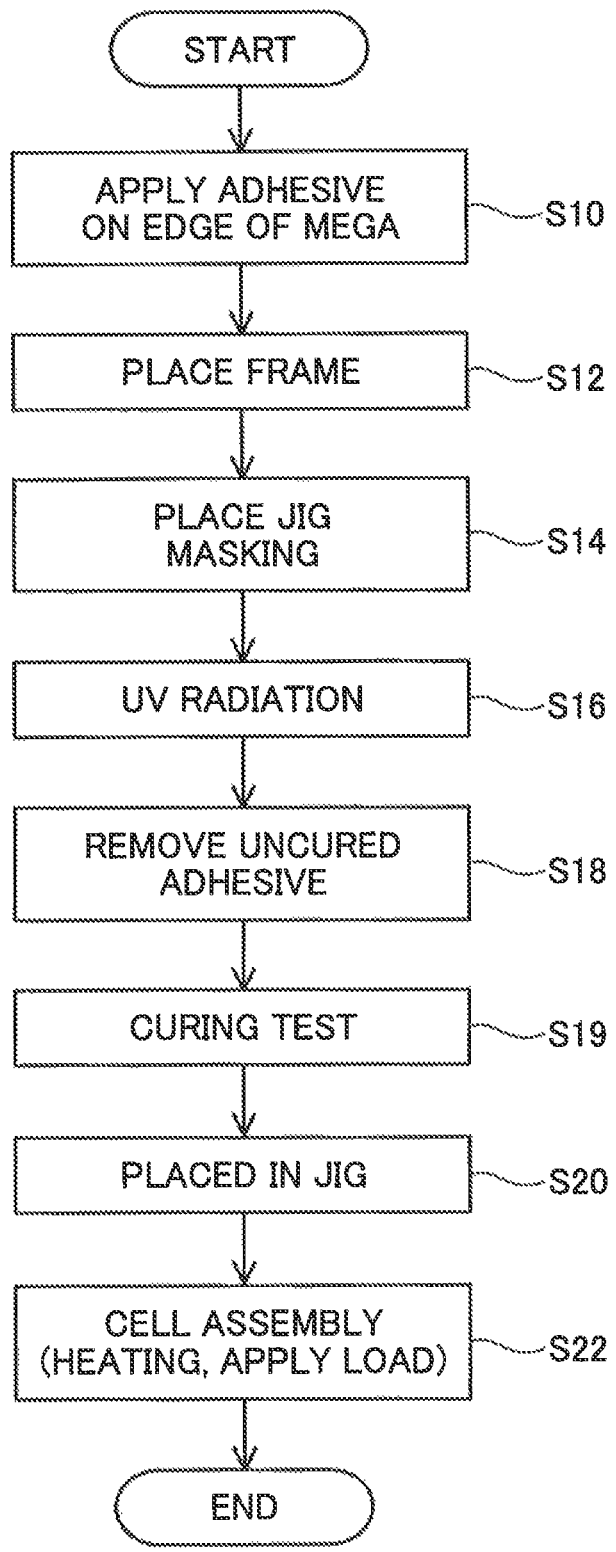
FIG. 8 is a flowchart showing a procedure of manufacturing the fuel cell according to the second embodiment.

FIG. 8 is a flowchart showing a procedure of manufacturing the fuel cell according to the second embodiment. The differences from the first embodiment shown in FIG. 3 include the advantageous effect by ultraviolet radiation at step S16 and addition of step S19 after step S18.

Steps S10 to S14 in FIG. 8 are similar to those of the first embodiment shown in FIG. 3. The second embodiment, however, uses the frame 300a in place of the frame 300 and uses the adhesive 400a in place of the adhesive 400. The second embodiment applies the adhesive 400a by screen printing after formation of the MEGA 200.

Figure 9:
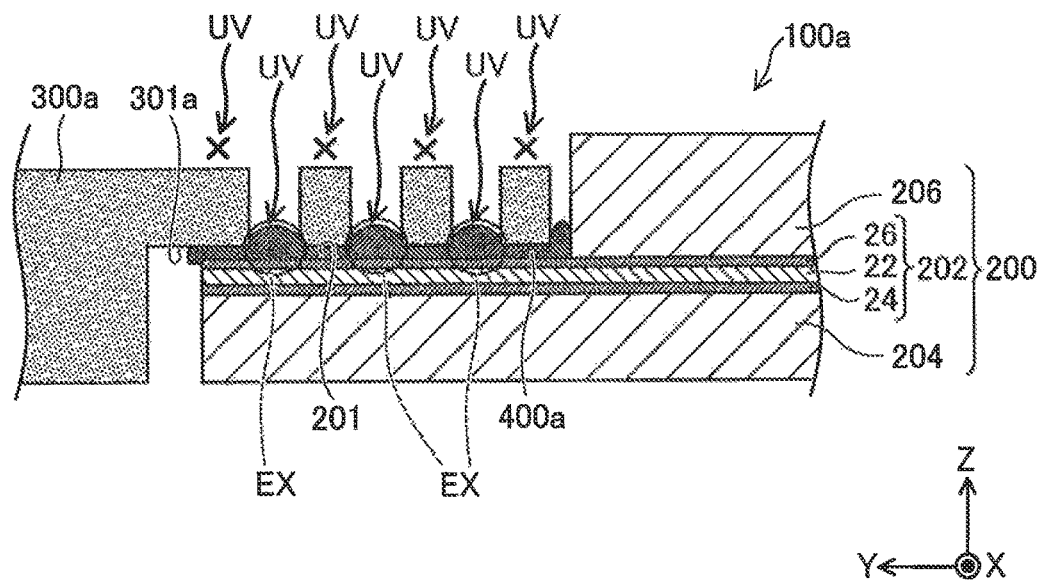
FIG. 9 is a diagram illustrating ultraviolet radiation in the case of applying the adhesive using a dispenser.
Figure 10:
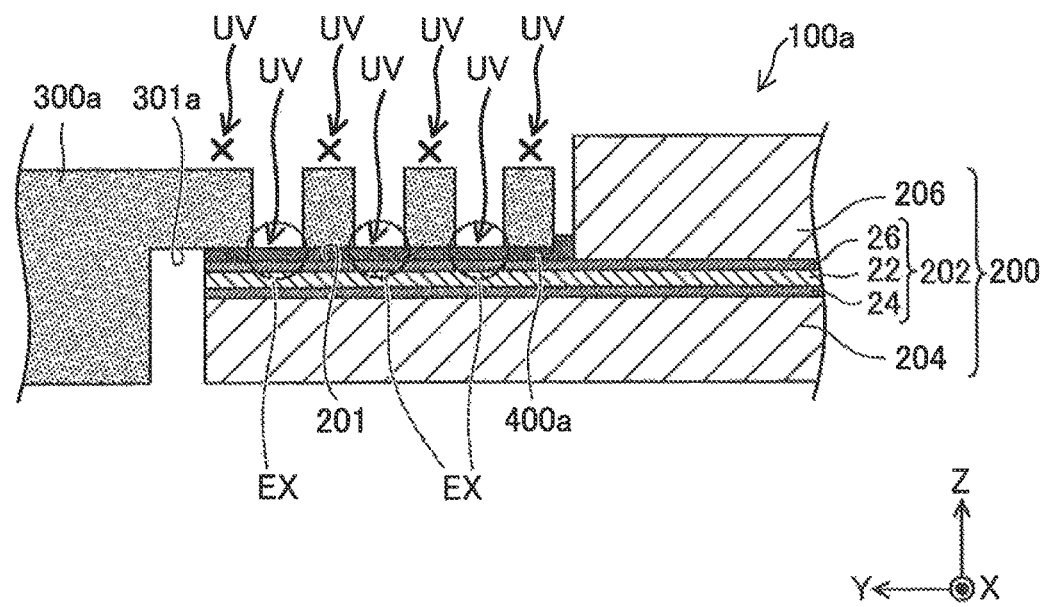
FIG. 10 is a diagram illustrating ultraviolet radiation in the case of applying the adhesive by screen printing.

FIG. 9 is a diagram illustrating ultraviolet radiation in the case of applying the adhesive using a dispenser. FIG. 10 is a diagram illustrating ultraviolet radiation in the case of applying the adhesive by screen printing. FIGS. 9 and 10 illustrate part of the section of the framed MEGA 100a along the XYZ axes identical with those shown in FIG. 6. For convenience of illustration, a jig and masking members placed at step S14 are omitted from the illustration of FIGS. 9 and 10.

At step S16 in FIG. 8, ultraviolet radiation is emitted from the space above the upper side of the jig (not shown). The rays entering the frame 300a in the emitted ultraviolet radiation UV are blocked by the frame 300a and do not reach the adhesive 400a (as shown by cross marks in FIGS. 9 and 10). The rays entering the through holes 305 (shown in FIG. 6) in the emitted ultraviolet radiation UV are, on the other hand, not blocked by the frame 300a and reach exposed portions EX of the adhesive 400a (as shown by broken-line circles in FIGS. 9 and 10). This results in curing the adhesive 400a in the exposed portions EX.

At step S18 in FIG. 8, after removal of the masking members (not shown) and the jig, the uncured adhesive 400a remaining on the surface of the cathode-side gas diffusion layer 206 is removed (shown in FIG. 4D). Step S18 may be performed only when any uncured adhesive 400a remains in the case of applying the adhesive using a dispenser.

Figure 11:
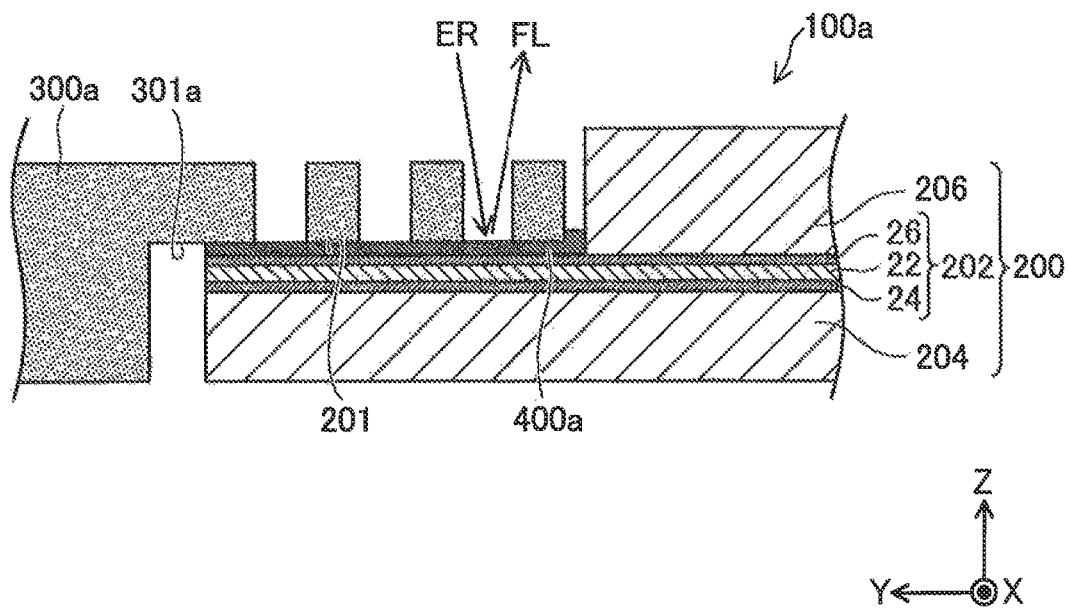
FIG. 11 is a diagram illustrating a curing test.

FIG. 11 is a diagram illustrating a curing test. FIG. 11 illustrates part of the section of the framed MEGA 100a along the XYZ axes identical with those shown in FIG. 6. At step S19 in FIG. 8, the adhesive 400a is subjected to a curing test using an ultraviolet curing sensor. The ultraviolet curing sensor emits weak ultraviolet light as excitation light and detects fluorescence emitted from a test sample to measure the curing state of the test sample. The ultraviolet curable resin varies the emission of fluorescence with the progress of curing. The ultraviolet curing sensor detects this variation and thereby detects the curing state of the ultraviolet curable resin as the test sample. The ultraviolet curing sensor used according to this embodiment is a UV curing sensor manufactured by SENTEC Co. Ltd.

At step S19 in FIG. 8, excitation light ER of the UV curing sensor is emitted through the through holes 305 of the frame 300a toward the exposed portions EX of the adhesive 400a. The curing test of the adhesive 400a then refers to the detection value of the UV curing sensor or the detection result of the curing state (acceptance or rejection) by measuring fluorescence FL emitted from the adhesive 400a. When multiple through holes 305 are provided in the frame 300a as shown in FIGS. 9 and 10, the test at step S19 may be performed for only one of the through holes 305, and may be performed for the multiple through holes 305.

Steps S20 and S22 in FIG. 8 are similar to those of the first embodiment shown in FIG. 3. A heat hardener is added to the adhesive 400a of this embodiment. Heating at step S22 accordingly cures the adhesive 400a that is not cured by ultraviolet radiation at step S16 (more specifically, remaining portions of the adhesive 400a other than the exposed portions EX). This results in more firmly bonding the frame 300a to the MEGA 200. Like the first embodiment, according to this embodiment, the adhesive 400a may be placed on at least one of or on both the protruding portion 201 of the MEGA 200 and the engagement portion 301a of the frame 300a.

As described above, the method of manufacturing the fuel cell according to the second embodiment has similar advantageous effects to those of the first embodiment. Additionally, in the method of manufacturing the fuel cell according to the second embodiment, the through holes 305 are formed in the engagement portion 301a of the frame 300a to pass through the frame 300a in the thickness direction of the frame 300a (Z-axis direction). Even when the frame 300a has the ultraviolet blocking characteristic, radiation of light (for example, excitation light ER such as ultraviolet radiation) through the through holes 305 enables the curing state of the adhesive 400a to be securely detected on the adhesion line where the adhesive 400a is provided. As a result, this embodiment enables a non-contact, non-destructive curing test to be performed using a device such as the ultraviolet curing sensor.

In order to suppress the cross leakage of the reactive gas between the anode and the cathode of the fuel cell, it is important that the adhesive 400a is cured to ensure sealing between the MEGA 200 and the frame 300a. The method of manufacturing the fuel cell according to the second embodiment allows for the non-contact, non-destructive curing test. The curing test at step S19 may thus be performed for all the manufactured cells of the fuel cell. This results in enhancing the reliability of the respective cells of the fuel cell and the reliability of the entire fuel cell.

B-4. Comparative Example

Figure 12:
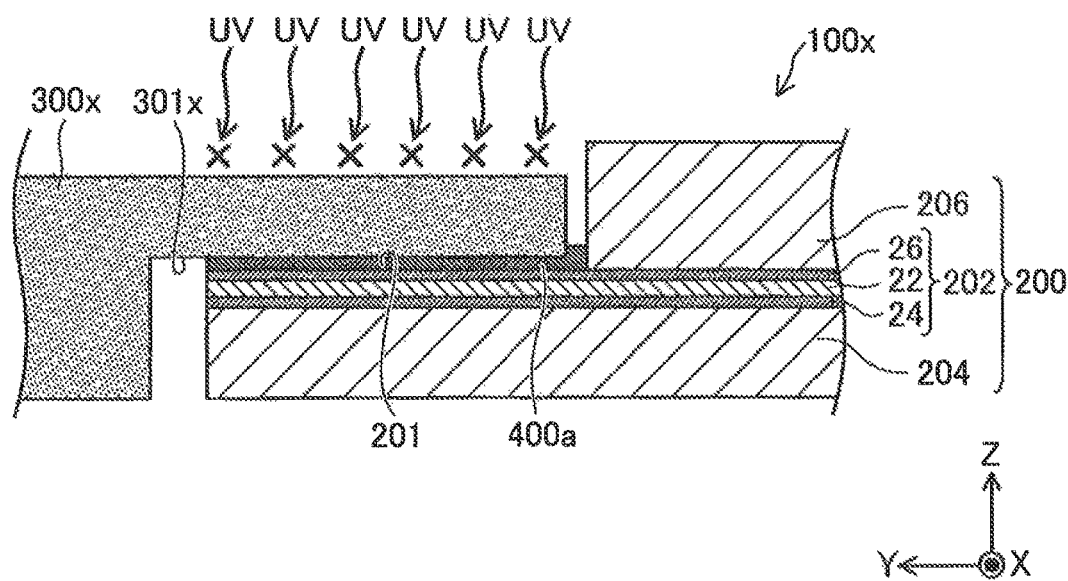
FIG. 12 is a diagram illustrating ultraviolet radiation according to a comparative example of the second embodiment.
Figure 13:
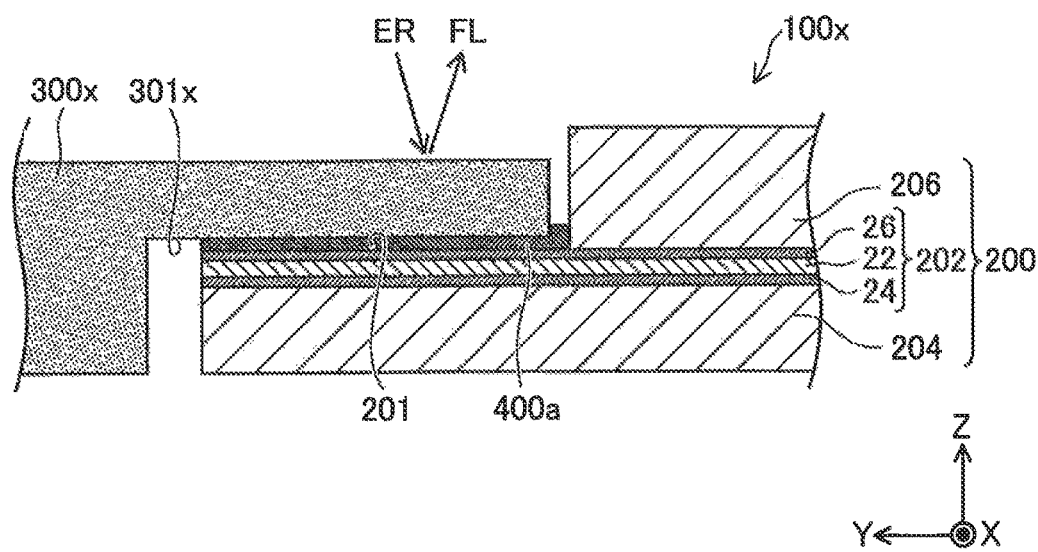
FIG. 13 is a diagram illustrating a curing test according to the comparative example of the second embodiment.

FIG. 12 is a diagram illustrating ultraviolet radiation according to a comparative example of the second embodiment. FIG. 13 is a diagram illustrating a curing test according to the comparative example of the second embodiment. FIGS. 12 and 13 illustrate part of the section of a framed MEGA 100x along the XYZ axes identical with those shown in FIG. 6. A fuel cell is manufactured by the procedure described above with reference to FIG. 8 using a frame 300x in place of the frame 300a (shown in FIG. 6) described in the second embodiment. The frame 300x has the structure similar to that of the frame 300a of the second embodiment except omission of the through holes 305 in an engagement portion 301x.

At step S16 in FIG. 8, ultraviolet radiation is emitted from the space above the upper side of a jig (not shown). The frame 300x is configured to block ultraviolet light having the wavelength equal to or lower than 380 nm. Almost the entirety of the emitted ultraviolet radiation UV enters the frame 300x to be blocked by the frame 300x and accordingly does not reach the adhesive 400a (as shown by cross marks in FIG. 12). As a result, in the comparative example, the adhesive 400a is not cured and thereby does not form an adhesive layer to bond the frame 300x to the MEGA 200.

The frame 300x has no through holes. In the curing test (step S19) of FIG. 8, excitation light ER of a UV curing sensor is emitted from the space above the upper side of the frame 300x toward the adhesive 400a (as shown in FIG. 13). As described above, the frame 300x blocks ultraviolet light having the wavelength equal to or lower than 380 nm. The emitted excitation light ER is accordingly blocked by the frame 300x and does not reach the adhesive 400a. Additionally, as shown in FIG. 13, the UV curing sensor detects fluorescence FL that is emitted when the frame 300x absorbs the excitation light ER. As a result, the comparative examples fails to detect the curing state of the adhesive 400a.

C. Third Embodiment

A third embodiment of the present disclosure describes a structure including an engagement portion of a frame formed in a different shape and additionally being provided with protective layers. The like components and the like processes to those of the second embodiment are expressed by the like signs to those of the second embodiment described above, and their detailed descriptions are omitted. In other words, the components and the processes that are not specifically described below are equivalent to those of the second embodiment described above.

C-1. Structure of Fuel Cell

The structure of a fuel cell according to the third embodiment is similar to that of the second embodiment, except a framed MEGA 100b is provided in place of the framed MEGA 100a.

C-2. Structure of Framed MEGA

Figure 14:
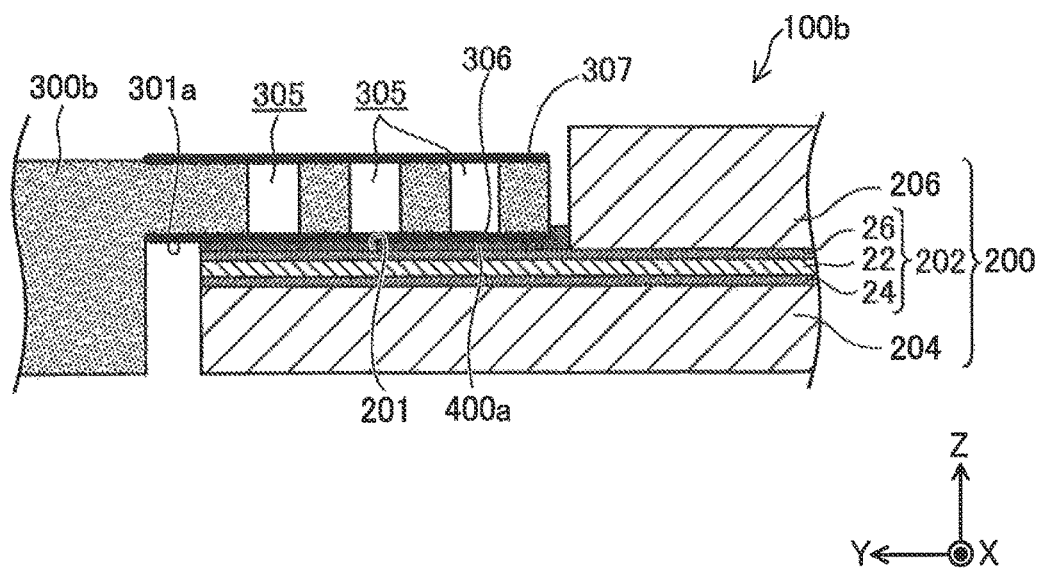
FIG. 14 is a diagram illustrating the structure of a framed MEGA according to a third embodiment.

FIG. 14 is a diagram illustrating the structure of the framed MEGA according to the third embodiment. FIG. 14 illustrates part of the section of the framed MEGA 100b along the XYZ axes identical with those shown in FIG. 6.

The framed MEGA 100b of the embodiment includes a frame 300b in place of the frame 300a (shown in FIG. 6). The frame 300b includes protective layers 306 and 307, in addition to the structure of the frame 300a of the second embodiment (shown in FIG. 6). The protective layers 306 and 307 may be comprised of thermoplastic resin films and are olefin sheets according to this embodiment. The olefin sheet has a characteristic of transmitting ultraviolet radiation. The protective layers 306 and 307 are arranged to cover at least the openings of through holes 305. More specifically, the protective layer 306 is arranged entirely over one surface of an engagement portion 301a that engages with the protruding portion 201 of the MEGA 200. The protective layer 307 is arranged entirely over the other surface of the engagement portion 301a that does not engage with the protruding portion 201 of the MEGA 200 (in other words, surface on which the engagement portion 301a is exposed).

The protective layers 306 and 307 may have any configuration that covers the openings of the through holes 305. For example, one exemplary configuration may use a plurality of protective layers 306 and a plurality of protective layers 307 formed slightly larger than the openings of the through holes 305 to individually protect the respective through holes 305. The protective layer 307 provided to cover the other surface of the engagement portion 301a (i.e., surface that does not engage with the protruding portion 201 of the MEGA 200) may be omitted. The protective layers 306 and 307 may be formed to cover the entire frame 300a, in addition to the engagement portion 301a.

C-3. Method of Manufacturing Fuel Cell

A method of manufacturing the fuel cell according to the third embodiment is similar to that of the second embodiment shown in FIG. 8, except the advantageous effects by placement of the frame 300b at step S12.

At step S12 in FIG. 8, the frame 300b is placed relative to the MEGA 200 with the adhesive 400a applied thereon. As shown in FIG. 14, the openings of the through holes 305 are covered by the protective layer 306 on one surface of the engagement portion 301a (i.e., surface that engages with the protruding portion 201 of the MEGA 200). Accordingly, even when the adhesive 400a used is readily deformable, for example, in the liquid form, jelly form, gel-like form or cream form, the protective layer 306 blocks the adhesive 400a by placing the frame 300b relative to the MEGA 200. This configuration results in suppressing the adhesive 400a from entering the through holes 305 of the frame 300b.

Figure 15:
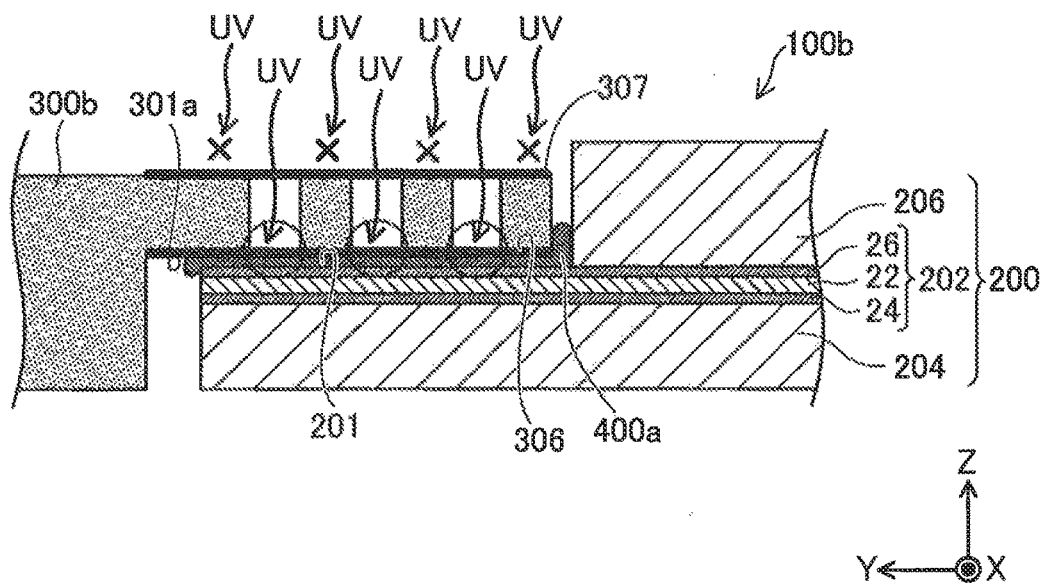
FIG. 15 is a diagram illustrating ultraviolet radiation in the case of applying the adhesive using a dispenser.
Figure 16:
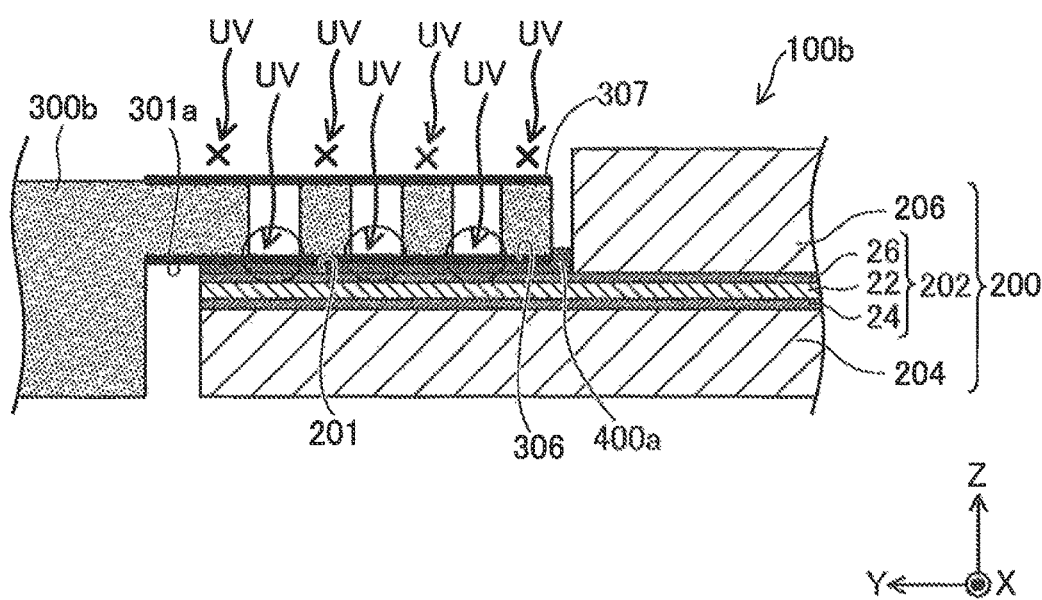
FIG. 16 is a diagram illustrating ultraviolet radiation in the case of applying the adhesive by screen printing.

FIG. 15 is a diagram illustrating ultraviolet radiation in the case of applying the adhesive using a dispenser. FIG. 16 is a diagram illustrating ultraviolet radiation in the case of applying the adhesive by screen printing. FIGS. 15 and 16 illustrate part of the section of the framed MEGA 100b along the XYZ axes identical with those shown in FIG. 6. For convenience of illustration, a jig and masking members placed at step S14 are omitted from the illustration of FIGS. 15 and 16.

At step S16 in FIG. 8, ultraviolet radiation is emitted from the space above the upper side of the jig (not shown). The protective layers 306 and 307 are made of the ultraviolet transmitting material. Accordingly the rays entering the through holes 305 (shown in FIG. 14) in the emitted ultraviolet radiation UV are not blocked by any of the frame 300b and the protective layers 306 and 307 but reach the adhesive 400a (as shown by broken-line circles in FIGS. 15 and 16). This results in curing the adhesive 400a, like the first embodiment.

At step S19 in FIG. 8, a curing test is performed. The protective layers 306 and 307 are made of the ultraviolet transmitting material. Excitation light of a UV curing sensor emitted through the through holes 305 of the frame 300b is accordingly not blocked by the protective layers 306 and 307 but reaches the adhesive 400a. As a result, this embodiment enables a non-contact, non-destructive curing test of the adhesive 400a to be performed using the UV curing sensor, like the second embodiment.

At step S22 in FIG. 8, each cell is subjected to heating and application of a load. The protective layers 306 and 307 are made of the thermoplastic resin and may thus be bonded to the members placed in the periphery of these protective layers 306 and 307. More specifically, heating at step S22 causes the protective layer 306 to be bonded to the adhesive layer, while causing the protective layer 307 to be bonded to the cathode-side separator 600 (shown in FIG. 1).

As described above, the method of manufacturing the fuel cell according to the third embodiment has similar advantageous effects to those of the second embodiment. Additionally, even when the readily deformable adhesive 400a, for example, in the liquid form, jelly form, gel-like form or cream form is used to form the adhesive layer, the configuration by the method of manufacturing the fuel cell according to the third embodiment suppresses the adhesive 400a from entering the through holes 305 of the frame 300b. The protective layers 306 and 307 allow for transmission of ultraviolet radiation. Ultraviolet radiation through the through holes 305 across the protective layers 306 and 307 thus enables the adhesive 400a to be surely cured and form an adhesive layer. Furthermore, the openings of the through holes 305 are covered by the protective layer 307 on the other surface of the engagement portion 301 (i.e., surface that does not engage with the protruding portion 201 of the MEGA 200) as shown in FIG. 14. This configuration suppresses dust and the like from entering the through holes 305 during inter-process conveyance in the method of manufacturing the fuel cell described above with reference to FIG. 8.

C-4. Comparative Example

Figure 17:
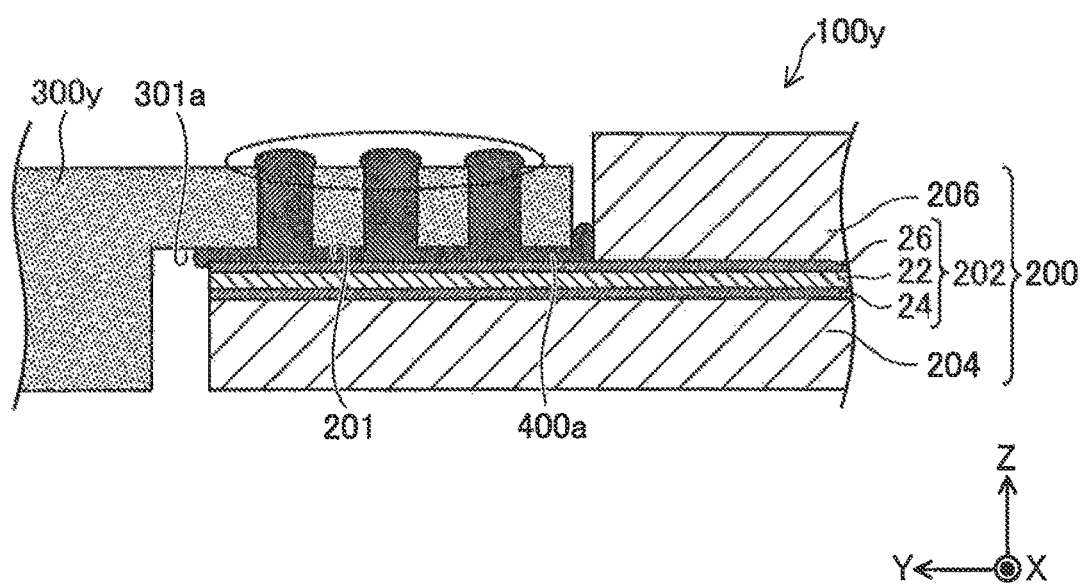
FIG. 17 is a diagram illustrating placement of a frame according to a comparative example of the third embodiment.

FIG. 17 is a diagram illustrating placement of a frame according to a comparative example of the third embodiment. FIG. 17 illustrates part of the section of a framed MEGA 100y along the XYZ axes identical with those shown in FIG. 6. A fuel cell is manufactured by the procedure described above with reference to FIG. 8 using a frame 300y in place of the frame 300b (shown in FIG. 14) described in the third embodiment. The frame 300y has the structure similar to that of the frame 300b of the third embodiment except omission of the protective layers 306 and 307.

At step S12 in FIG. 8, the frame 300y is placed relative to the MEGA 200 with the adhesive 400a applied thereon. This reference example describes an example of applying the adhesive 400a in the liquid form using a dispenser. The frame 300y has no protective layers. Accordingly, depending on the amount of the adhesive 400a applied on the MEGA 200, the adhesive 400a is likely to be protruded from the through holes 305 of the frame 300y and exposed on the surface of the frame 300y. In this comparative example, such protrusion of the adhesive 400a may result in failing to ensure sealing between the frame MEGA 100y and the separator and may cause adverse effects, such as leakage of the reactive gas at the anode or at the cathode and deterioration of the power generation performance of the fuel cell.

D. Modifications

The embodiments of the disclosure described above are provided only for the purpose of facilitating the understanding of the disclosure and not for the purpose of limiting the disclosure in any sense. The disclosure may be changed, modified and altered without departing from the spirit and the scope of the disclosure and includes equivalents thereof.

For example, the MEGA is configured to have a protruding portion on the cathode-side gas diffusion layer-side. According to a modification, the MEGA may be configured to have a protruding portion on the anode-side gas diffusion layer-side. This modified configuration provides the similar advantageous effects to those of the above embodiments. According to another modification, the MEGA may be configured to have protruding portions provided by protruding the CCM outside on both the cathode-side gas diffusion layer-side and the anode-side gas diffusion layer-side. In this modification, the frame may have two engagement portions to respectively engage with the two protruding portions of the MEGA. The two protruding portions of the MEGA may be respectively bonded to the two engagement portions of the frame by an adhesive (adhesive layers). This modified configuration also provides the similar advantageous effects to those of the above embodiments.

For example, the protruding portion of the MEGA may be formed by providing the CCM, the anode-side gas diffusion layer and the cathode-side gas diffusion layer formed in the same size and stacking these components with shifting their centers. This modified configuration also provides the similar advantageous effects to those of the above embodiment.

For example, a method similar to that described in the above embodiments may be employed for a configuration that places GDE (gas diffusion electrodes) on the respective surfaces of an electrolyte membrane, in place of the configuration that places the gas diffusion layers on the respective surfaces of the CCM.

For example, the placement of the masking members at step S14 may be omitted in the above method of manufacturing the fuel cell. Similarly, the removal of the adhesive at step S18 may be omitted. The curing test at step S19 may also be omitted. The cell assembly at steps S20 and S22 may also be omitted.

In the embodiments described above, the protruding portions are formed on four sides of the MEGA, and the frame has four engagement portions that are provided to respectively engage with the four protruding portions. The number of the protruding portions and the number of engagement portions may, however, be changed to be any number equal to or greater than 1.

One example of the material (PEN) for the frame is described in the above second and third embodiments. The material of the frame may, however, be changed to any material and may be, for example, PP that is used in the first embodiment. The specific numerical values are described in the above second and third embodiments with regard to the wavelength (365 nm) for curing the adhesive and the ultraviolet blocking characteristic (equal to or lower than 380 nm) of the frame. These specific numerical values are only one example.

One example of the material (olefin sheet) for the protective layer is described in the above third embodiment. The material of the protective layer may, however, be changed to any material that transmits ultraviolet light and may be, for example, PP that is used for the frame in the first embodiment.

The disclosure is not limited to any of the embodiments, the examples and the modifications described above but may be implemented by a diversity of other configurations without departing from the scope of the disclosure. For example, the technical features of any of the embodiments, the examples and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential herein.

REFERENCE SIGNS LIST 22 electrolyte membrane
24 anode-side electrode catalyst layer
26 cathode-side electrode catalyst layer
201 protruding portion
204 anode-side gas diffusion layer
206 cathode-side gas diffusion layer
300, 300a, 300b, 300x, 300y frame
301, 301a, 301x engagement portion
302 jig
304 first masking member
306 second masking member
400, 400a adhesive
500 anode-side separator
600 cathode-side separator
700 stacked body
800 fuel cell
A1 area A2 area
ER excitation light
EX exposed portion
FL fluorescence
UV ultraviolet radiation

The invention claimed is:

1. A fuel cell, comprising:
a membrane electrode assembly configured such that electrode catalyst layers are formed on respective surfaces of an electrolyte membrane;
gas diffusion layers placed on respective surfaces of the membrane electrode assembly; and
a frame placed around periphery of the membrane electrode assembly, wherein
the membrane electrode assembly has a protruding portion that protrudes outside of an outer edge of one of the gas diffusion layers when the membrane electrode assembly is combined with the gas diffusion layers,
the frame has an engagement portion that is configured to engage with the protruding portion outside of the outer edge of one of the gas diffusion layers, and wherein
the fuel cell further comprises
an adhesive layer formed from an ultraviolet curable adhesive between the protruding portion and the engagement portion,
wherein the engagement portion of the frame includes a through hole that is formed to pass through the frame in a thickness direction of the frame;
wherein the frame further includes a protective layer that transmits ultraviolet light and that is formed to cover at least an opening of the through hole.

2. The fuel cell according to claim 1,
wherein the protective layer of the frame is formed from a thermoplastic resin.

* * * * *